United States Patent [19]

Richardson

[11] Patent Number: 5,058,917

[45] Date of Patent: Oct. 22, 1991

[54] TWO-STAGE RETRACTABLE SUSPENSION

[75] Inventor: Gregory A. Richardson, Holton, Mich.

[73] Assignee: Neway Corp., Muskegon, Mich.

[21] Appl. No.: 591,397

[22] Filed: Oct. 1, 1990

[51] Int. Cl.⁵ .............................................. B60G 9/02
[52] U.S. Cl. ................................. 280/704; 280/414.5; 180/209; 105/215.2
[58] Field of Search ...................... 280/704, 711, 414.5; 180/209; 105/72.2, 215.2

[56] References Cited

U.S. PATENT DOCUMENTS

| | | | |
|---|---|---|---|
| 2,821,409 | 1/1958 | Chalmers | 280/440 |
| 3,001,796 | 9/1961 | Martin | 280/43.18 |
| 3,342,141 | 9/1967 | Browne | 105/215.2 |
| 4,165,884 | 8/1979 | Allison et al. | 280/704 |
| 4,300,787 | 11/1981 | Vandenberg | 280/704 |
| 4,309,045 | 1/1982 | Raidel | 280/711 |
| 4,364,315 | 12/1982 | Beatty | 105/215.2 |
| 4,501,437 | 2/1985 | Becker | 280/704 |
| 4,763,953 | 8/1988 | Chalin | 280/704 |

Primary Examiner—Kenneth R. Rice
Attorney, Agent, or Firm—Varnum, Riddering, Schmidt & Howlett

[57] ABSTRACT

An improvement is provided for a vehicle suspension of the type comprising a pair of control arms pivotally mounted to a frame of the vehicle and carrying ground-engaging wheels. A transverse beam extends between the free ends of the control arms and supports a pair of air springs. A carriage is also pivotally connected to the frame which is mounted to an upper portion of the air springs so that the air springs are disposed between the carriage and the transverse beam. The carriage includes a brace for bracing the carriage relative to the frame when the wheels are in a highway mode. During retraction of the wheels from engagement with the ground surface, the brace is released from engagement with the frame during a first stage of retraction, and the control arms and carriage are moved toward the frame during a second stage of retraction.

20 Claims, 8 Drawing Sheets

TWO-STAGE RETRACTABLE SUSPENSION

BACKGROUND OF THE INVENTION

1. Field of the Invention

This invention relates to motor vehicle suspensions. More particularly, the invention relates to lift mechanisms for retractable suspensions used on trailers which are adaptable for both highway and railroad use.

2. Scope of the Prior Art

An increasingly common form of transportation includes the use of trailers which are adapted for both highway and railroad use. Such trailers are typically constructed with reinforced frames designed to withstand the forces of normal rail service as well as the forces associated with normal highway service. The wheel gear upon which the trailers ride obviously depends upon whether the trailer is to be used in normal highway service or on a railroad track. In the former, conventional ground-engaging rubber tires are required, and in the latter, a rail wheel set, sometimes known as a rail bogie, must be used.

One trailer in common use is known as a Mark IV trailer which is a completely integrated intermodal vehicle. The Mark IV trailer comprises a two-axle highway wheel set and a single-axle rail wheel set, both of which are retractable by means of an air suspension. In the highway mode, the rail wheel set is retracted, and in the rail mode, the highway wheel set is retracted. Typically, the rail wheels are disposed between the tandem axles of the highway wheels. One of the problems with the Mark IV design is that the trailer carries an extra load of deadweight which necessarily forces restrictions on the load-carrying capacity of the trailer in highway use.

Another version commonly used is known as a Mark V trailer which carries no rail-running gear. Instead, its highway wheel set slides forward so that the trailer can be mounted on a freestanding, air suspension, two-axle rail bogie. The suspension in the highway wheel set of the Mark V trailer provides multiple functions. Not only does it provide a normal highway suspension for the wheel set, but it also enables the rear of the trailer to lift relative to the ground to permit the rail bogie to be maneuvered into place underneath the rear of the trailer. The suspension also retracts the highway wheel set relative to the ground so that the trailer comes to rest upon the rail bogie, thus permitting the trailer to be utilized in normal rail service.

Both systems provide lift mechanisms for retracting the highway wheel set with respect to the trailer. The Mark V trailer is lighter than the Mark IV because it does not carry the extra deadweight. However, both trailers provide limited lift of the highway wheel set so that there is a low clearance when the trailer is in the rail mode. Further, the lift mechanisms in both trailers are biased toward the retracted position to prevent the unused wheel set from accidentally falling and interfering with the action of the used wheel set.

There is a need to provide additional lift to a highway wheel set in a trailer that is adapted for use with a detachable rail bogie. It has also been found advantageous to provide an alternative means for securing the highway wheel set in the normal highway mode.

SUMMARY OF THE INVENTION

The invention is directed to an improvement in a suspension for any vehicle which has a frame. The suspension includes a pair of control arms pivotally mounted to the frame, whereby the control arms carry ground-engaging wheels, and lift means for moving the control arms and the wheels to a retracted position relative to the frame. The pivotal mounting of the control arms provides the control arms with a swinging movement relative to the frame, and a spring means mounted between the control arms in the frame cushions the swinging movement.

The improvement comprises a carriage pivotally mounted to the frame, with the carriage supporting an upper portion of the spring means. The free end of the carriage pivots between a first position adjacent to the frame and a plane defined by the longitudinal axes of the control arms. The spring means is thus disposed between the control arms and the carriage. This structure permits smaller spring means to be employed while the wheels can be moved a greater degree toward the frame when the lift means moves the control arms and the wheels to the retracted position than by simply collapsing the spring means alone. Preferably, the carriage pivots about the same axis as the control beam.

In one aspect of the invention, a transverse beam is mounted between the control arm, and a lower portion of the spring means is supported by the beam. The spring means can comprise an air spring.

In another aspect of the invention, the suspension comprises bracing means for fixing the carriage in a third position relative to the frame when the wheels are in the ground-engaging position, and for releasing the carriage for movement between the first and second positions. The bracing means is preferably carried by the carriage and comprises a link having one end pivotally connected to the carriage and an actuator connected to the link for moving the link toward and away from a bracing position. The other end of the link carries a bumper which will contact the frame when the link is in the bracing position.

Preferably, the actuator comprises a housing defining a fluid chamber with a push-rod extending from the chamber. The rod has an outer end pivotally connected to the link and is movable in a generally longitudinal direction in response to the delivery and exhaustion of pressurized air to the chamber.

BRIEF DESCRIPTION OF THE DRAWINGS

The invention will now be described with reference to the following drawings in which.

DETAILED DESCRIPTION OF THE PREFERRED EMBODIMENTS

Figure 1:
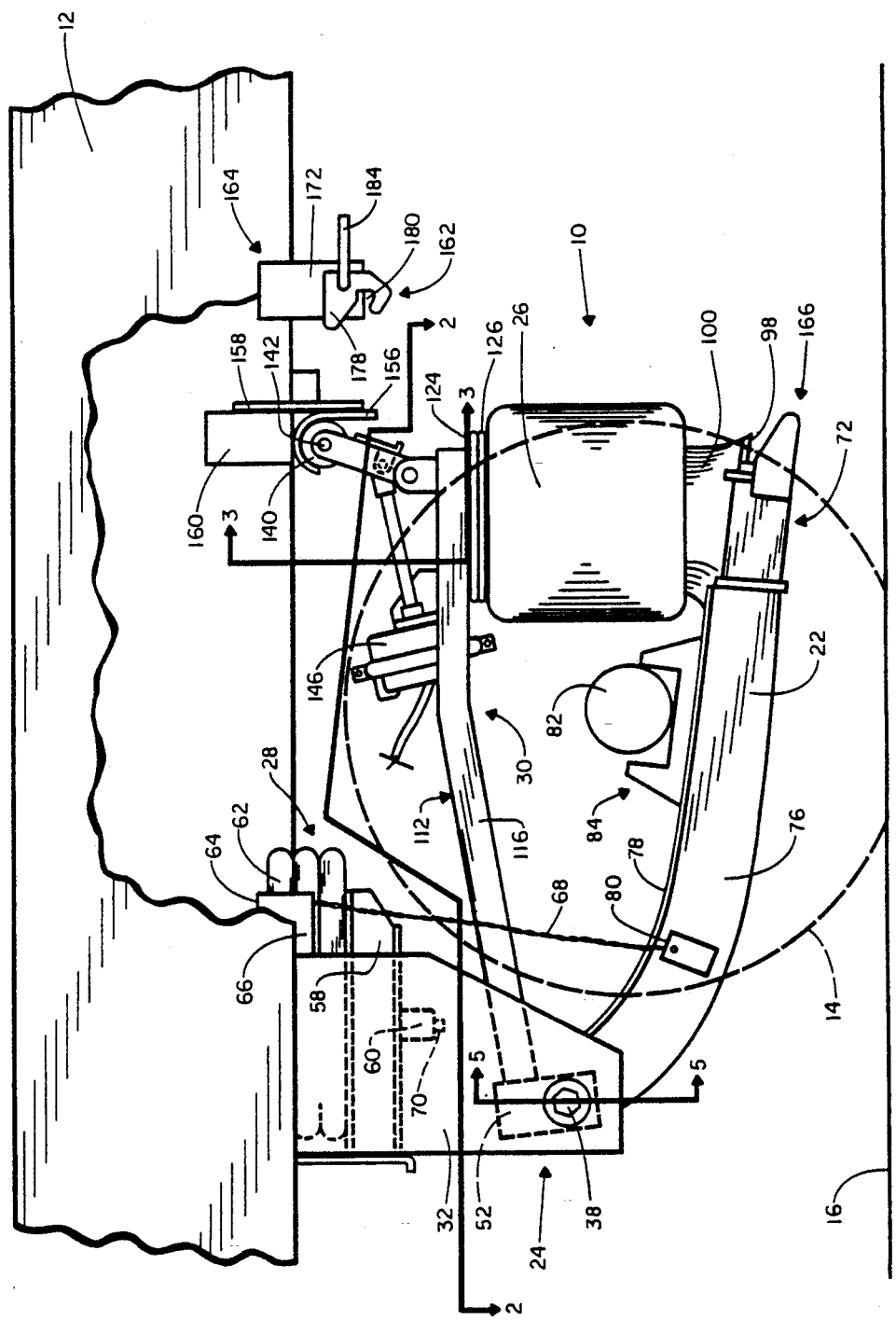
FIG. 1 is an elevational view of a retractable suspension according to the invention in the normal highway mode.
Figure 7:
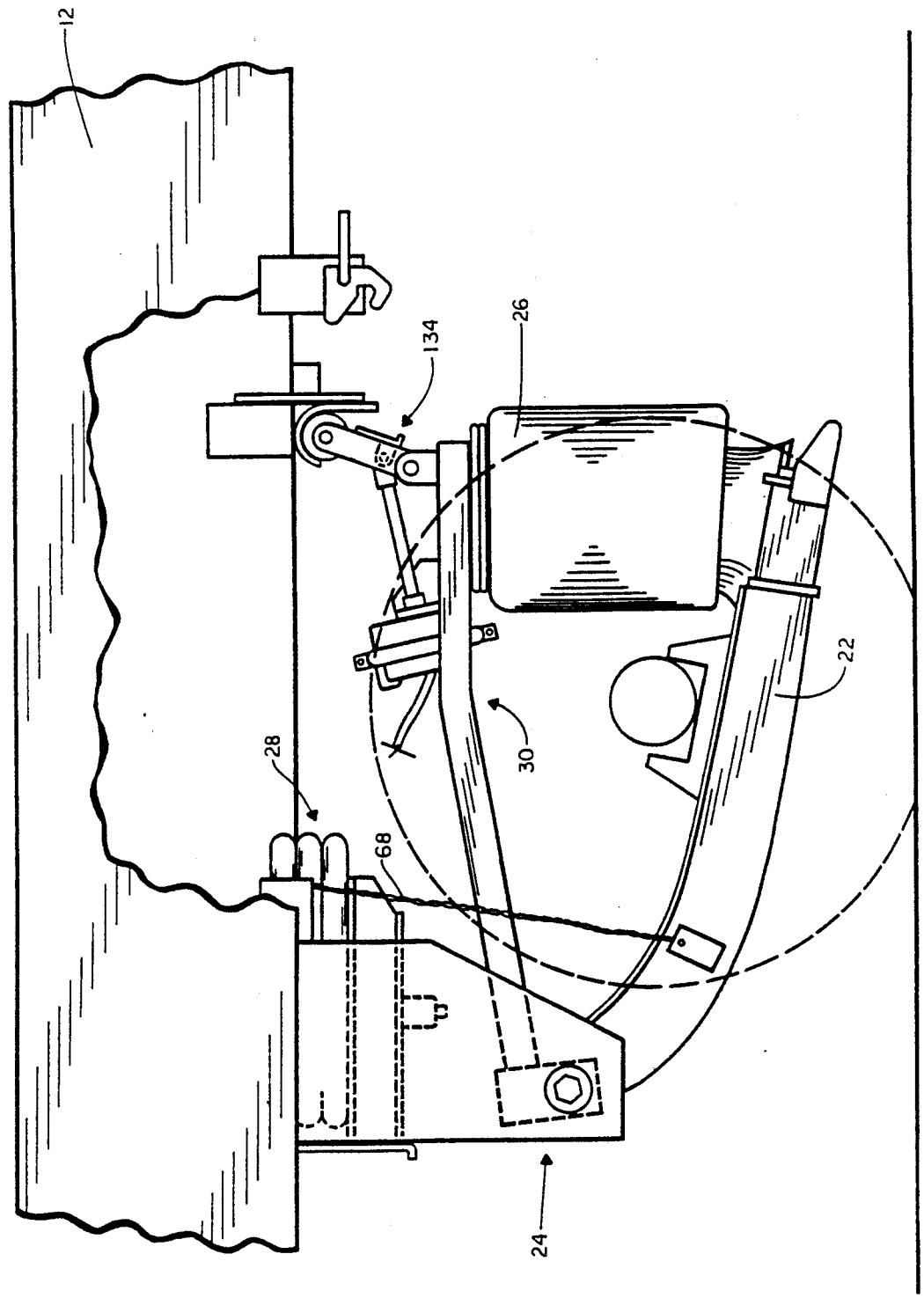
FIG. 7 is an elevational view of the suspension of FIG. 1 in the extended mode wherein the trailer can be attached to a rail bogie.
Figure 9:
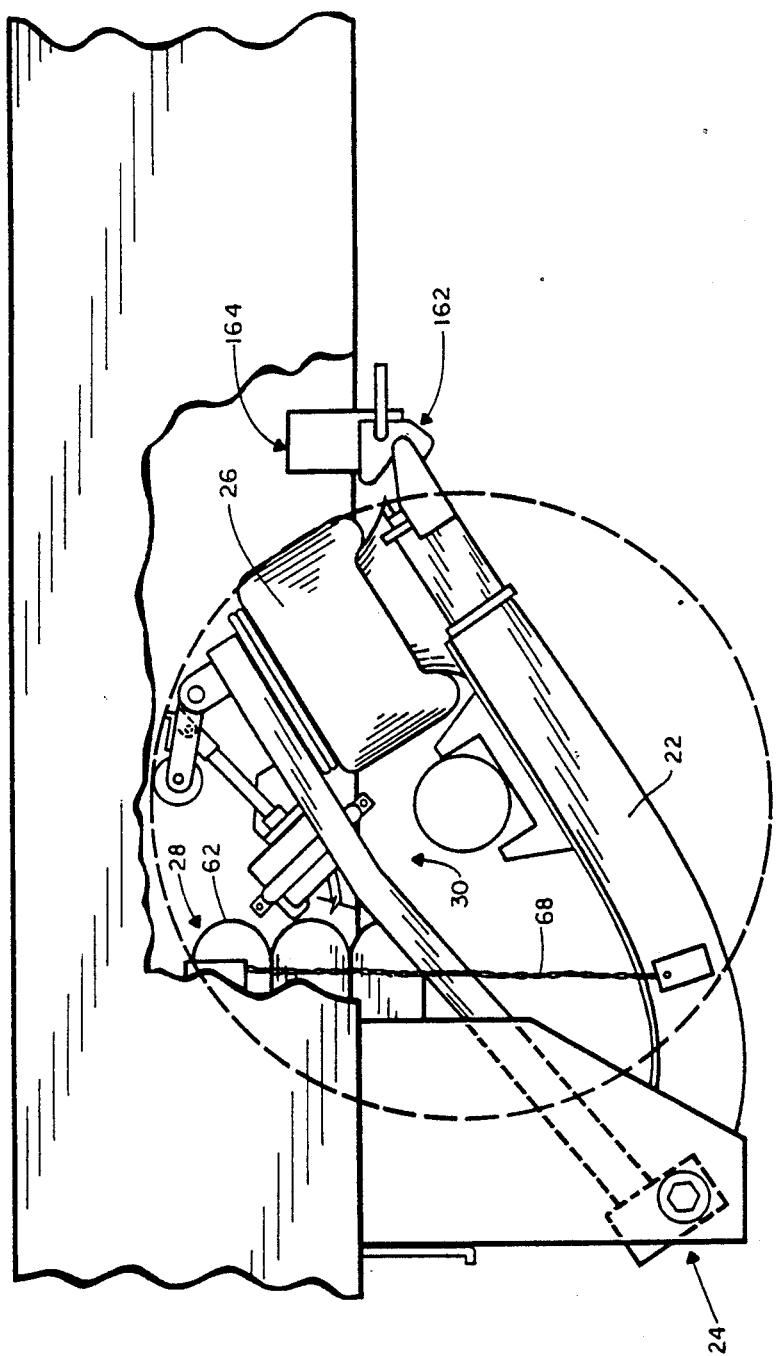
FIG. 9 is an elevational view of the suspension of FIG. 1 in the retracted mode.

Referring now to FIG. 1, there is shown a suspension system 10 constructed substantially in accordance with the principles of the invention. The suspension 10 is mounted beneath a frame 12 and supports ground-engaging wheels 14. The suspension 10 is further adapted to be retractable whereby the wheels 14 may be lifted off of the ground surface 16 as illustrated in FIG. 9. Further, the suspension 10 is extendable whereby the frame 12 may be lifted relative to the ground surface 16, as illustrated in FIG. 7.

Figure 4:
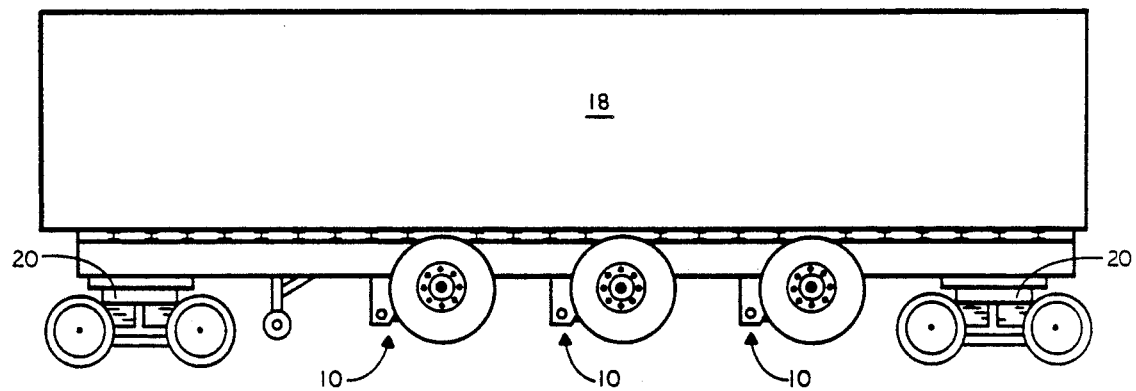
FIG. 4 is an elevational view of a trailer mounted on a rail bogie, and having a tri-modem wheel set incorporating a suspension in accordance with the invention in the retracted position.

Although the suspension herein described supports a single axle having a single pair of ground-engaging wheels 14, it will be understood that the preferred construction utilizes a tandem axle suspension, or a tridem axle suspension. In any event, a principal function of the retractable suspension is to permit the utilization of the vehicle on a railway in addition to use on a highway. FIG. 4 illustrates a typical configuration of a tridem trailer 18 having a suspension 10 in the retracted position, and mounted on a rail bogie 20 for railroad use. It will be understood that the rail bogie, and detachment mechanisms for securing the trailer to the rail bogie, form no part of this invention, and, in fact, are not necessary for practicing the invention. The retractable suspension 10 serves to lift the trailer 18 a sufficient distance to permit the rail bogie or other support to be placed beneath the trailer; it thereafter retracts the wheels from the ground to permit the trailer to rest and ride upon the bogie or other support.

Turning again to FIG. 1, it can be seen that the suspension 10 comprises a pair of trailing arms 22 also sometimes known as control arms, one mounted to each side of the frame 12 in generally parallel relation to each other. Each trailing arm 22 is pivotally mounted at a front end thereof to a frame bracket assembly 24. A pair of primary air springs 26 is disposed at a rearward portion of the trailing arms 22 so as to cushion the upward and downward movement of the frame 12 with respect to the ground-engaging wheels 14. A lift means 28 serves to retract the trailing arms 22 and thus the suspension 10 relative to the frame 12. It can be seen that the frame 12 has a depth greater than that of a conventional trailer frame. This increased depth permits the trailing arms 22 and the wheels 14 carried thereby to be retracted further from the ground surface 16 than would ordinarily be permitted in a conventional trailer. However, a swingable carriage 30 is provided intermediate the trailing arms 22 and the trailer frame 12 for supporting an upper portion of each air spring so that conventional air springs 26 may be used, while still permitting the greater movement of the trailing arms 22 and the wheels.

Figure 5:
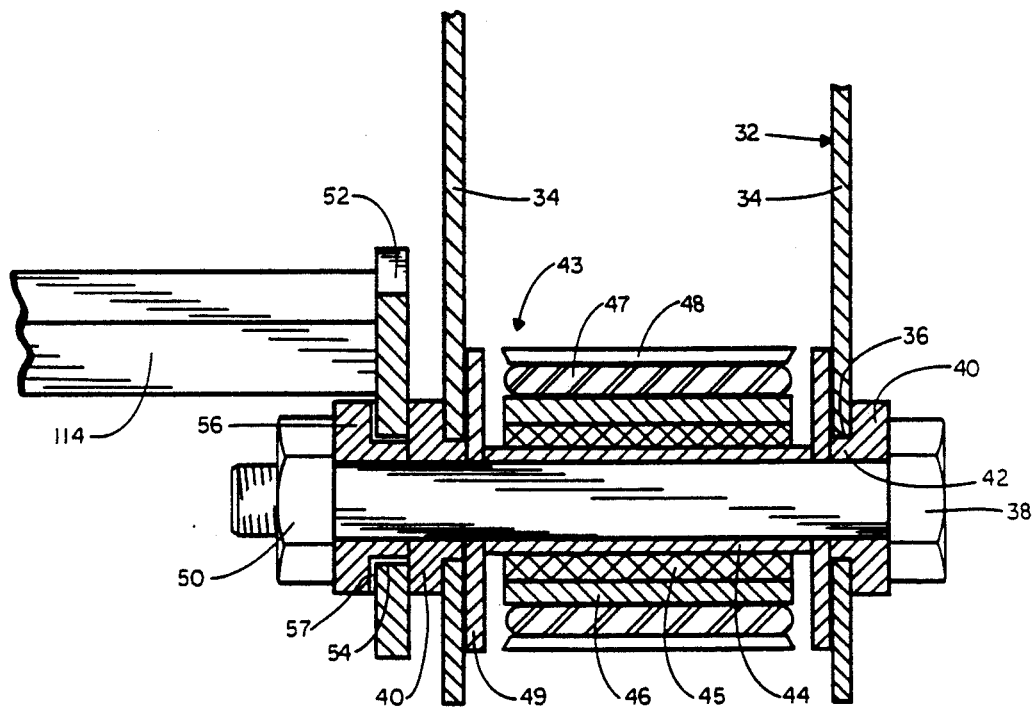
FIG. 5 is a cross-sectional view of a bushed connection taken along line 13—13 of FIG. 1.

Referring now to FIGS. 1 and 5, it can be seen that a frame bracket 32 depends from the frame 12 to pivotally mount each trailing arm 22. The frame bracket 32 or the frame itself 12 may carry a conventional fixture (not shown) for mounting the upper end of a shock absorber.

It can be seen that the frame bracket 32 comprises a pair of spaced arms 34 which depend from the frame 12 so that the space between the arms is in alignment with the ground-engaging wheel 14. Each arm 34 has an elongated opening 36 through which a bolt 38 passes. The openings 36 are elongated in the direction of the axis of the vehicle so as to permit the bolt 38 to shift forwardly or rearwardly with respect to the frame bracket 32. An adjustment plate 40 having a boss 42 which projects into the opening 36 is provided on the outer surface of each depending arm 34. This structure facilitates the forward and aft adjustment of each trailing arm 22 in a pair so as to align the suspension 10 relative to the frame 12. The frame bracket 32 and adjustment plates 40 may have interengaging serrations for a gripping adjustment, or alternatively, the adjustment plates 40 may be welded to the frame bracket 32 when proper alignment is obtained.

Each trailing arm 22 is connected to a frame bracket 32 by arm connecting means 43, the detail of which is best illustrated in FIG. 5. The arm connecting means 43 comprises an inner sleeve 44 which carries a bronze bearing 45 for free rotational movement about the sleeve. The bearing 45 is press fit into a bushing core 46 which mounts a resilient elastomer bushing 47. The bearing 45, bushing core 46, and bushing 47 each have a length less than the length of the inner sleeve 44. The elastomer bushing 47 is received in a forward collar 48 on the trailing arm 22 to be tightly confined between the forward collar 48 and the bushing core 46. The collar 48 is substantially the same length as the elastomer bushing 47, i.e., less than the length of the inner sleeve 44. The inner sleeve 44 is disposed coaxially with the elongated opening 36 and each end of the inner sleeve abuts a plate 49 on the interior of the depending arms 34 of the frame bracket 32. Tightening of the bolt 38 with a nut 50 will clamp the inner sleeve 44 tightly within the frame bracket 32. The forward collar 48 on the trailing arm 22 is thus rotatable with respect to the inner sleeve 44. In practice, the degree of rotation may be at least as much as 60 degrees, but it will be apparent that the elastomer bushing 46 will also permit articulation of the trailing arm 22 in a torsional sense as well as in a linear sense. In other words, the trailing arm 22 can pivotably articulate about the axis of the bolt 42 as well as about an axis perpendicular to the axis of the bolt 38.

A lever 52 is provided for pivotably connecting the carriage 30 to the frame bracket 32. The lever 52 is formed of a single plate having an opening 54 through which the bolt 38 passes so that the lever 52 is pivotable about the axis of the bolt 38. A stepped washer 56 disposed between the nut 50 and the lever 52 carries a nylon sleeve 57 and confines the lever to the space between the washer and the adjustment plate 40 on the interior arm 34 of the frame bracket 32. The nylon sleeve 57 provides a bearing surface to permit rotation of the lever 52 about the bolt 38.

Referring again to FIGS. 1 and 2, a lift spring support plate 58 is centrally located on a lift support cross member 60 which extends between the opposed frame brackets 32. The lift spring support plate 58 carries an air spring 62 thereupon. The air spring 62 is preferably a triple-convoluted air spring which, when inflated, expands upwardly a significant linear distance. An upper crosspiece 64 mounts an upper surface of the air spring 62 and is secured thereto in a conventional manner. A pair of flanges 66 depend from opposite sides of the upper crosspiece 64, and a flexible cable member 68, such as a chain, extends between and is connected to the flange 66 and the trailing arm 22 on each side of the vehicle. An air supply port 70 is provided through the lift support cross member 60 in communication with the interior of the air spring 62 to facilitate the delivery of pressurized air to the air spring from a source (not shown).

The free end of the trailing arm 22 carries a pivotal connection 72 with a transverse beam 74, which extends between the trailing arms 22. An intermediate portion 76 of each trailing arm 22 carries a flange at an upper portion thereof which defines an upper surface 78. A lift cable connection 80 is mounted to the trailing arm 22 for connecting an end of the flexible cable member 68 thereto. Means may also be provided on the trailing arm 22 for connecting a shock absorber (not shown) to control rebound of the air springs 26.

Figure 6:
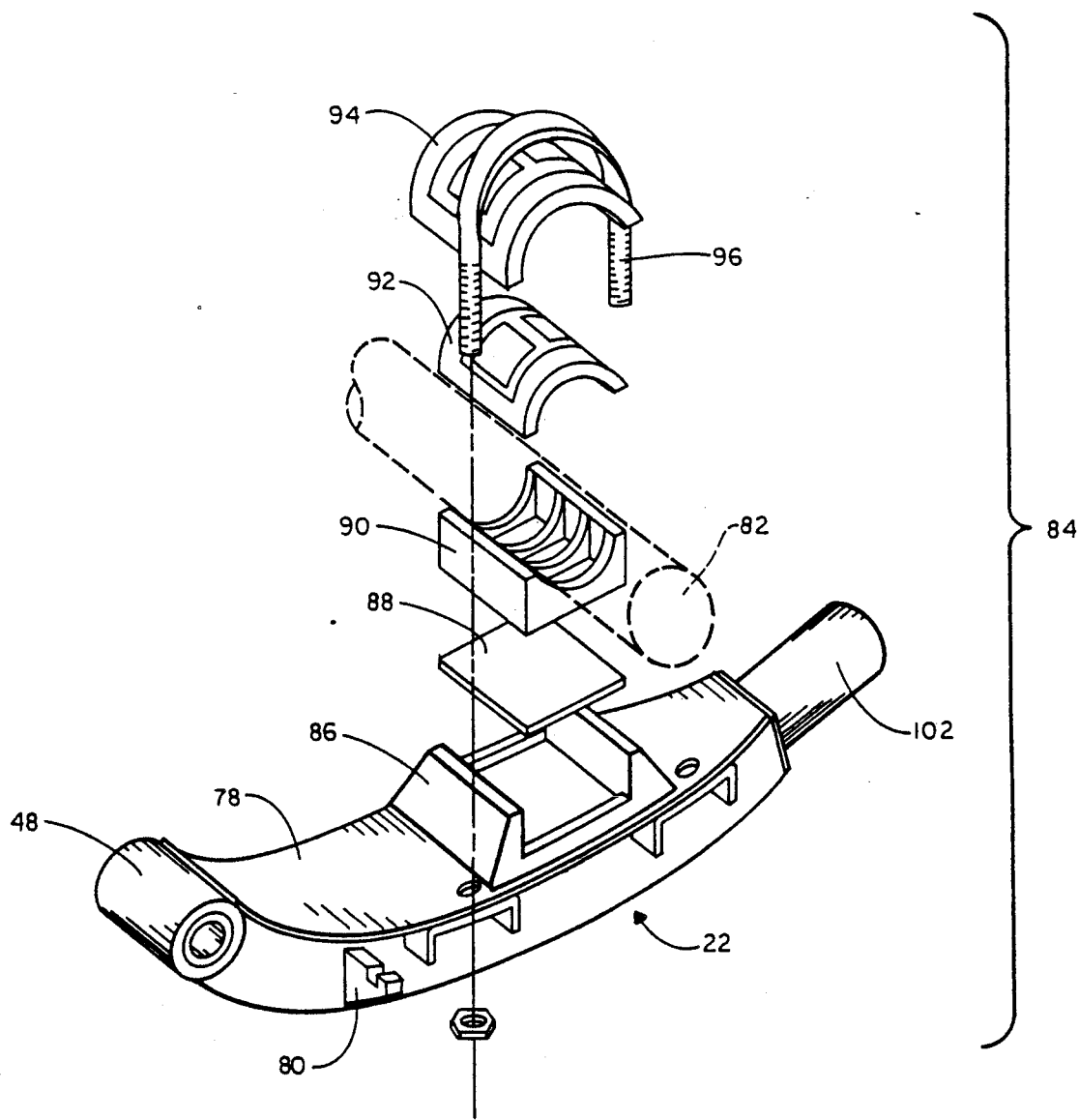
FIG. 6 is an isometric exploded view of the trailing arm and axle connection of the suspension illustrated in FIG. 1.

An axle 82 associated with the trailer 18 is fixedly secured to and substantially disposed between an opposed pair of trailing arms 22 by an axle connection 84. The axle connection 84 is best illustrated in FIG. 6. A saddle bracket 86 is rigidly secured to and supported on the upper surface 78 of the trailing arm 22 adjacent the intermediate portion thereof. A resilient pad 88 disposed within the saddle bracket 86 supports an axle adapter bracket 90 which is conformed to receive a particular shape of the axle 82. In the embodiment illustrated, the cross-sectional shape of the axle is circular, but it will be understood that different shapes may well be provided for different axles. Thus, the axle adapter bracket 90 will be provided to receive a particularly configured axle. An upper resilient pad 92 is tightly confined between an upper clamp plate 94 and the axle 82, with the upper clamp plate having a shape complementary to that of the axle. Clamp bolts 96, which may be generally U-shaped, extend through the saddle bracket 86 to clampingly secure the axle to the trailing arm. The lower and upper resilient pads 88, 92 permit the axle 82 to articulate slightly relative to the trailing arm 22 in response to torsional forces imparted to the axle when the trailing arms are not parallel as, for example, when the trailer is moved uneven ground surface. However, it would also be apparent from this construction, that the axle 82 will tend to resist lateral forces acting upon the trailing arms 22 when the trailer is used in the highway mode.

Turning again to FIGS. 1 and 2, the transverse beam 74 is connected to and extends between each pair of trailing arms 22. The beam 74 has adjacent each end a platform or a support plate 98 which supports the piston 10 of the air spring 26. The pivotal connection 72 by which the transverse beam 74 is connected to the trailing arm 22 is of a construction more particularly described in U.S. Pat. No. 3,547,215 to Bird wherein a pin or stud 102 is provided at an end portion of the trailing arm 22. Typically, the stud 102 extends rearwardly and coaxially with a longitudinal axis 103 of the arm 22. A collar 104 at each end of the beam 74 surrounds the stud 102. A sleeve and elastomer bushing (not shown) are disposed between the stud 102 and the collar 104 to permit limited articulation of the beam 74 relative to the trailing arms 22. The collar 104 and the bushing are contained between a flange 106 on the trailing arm 22 and a washer 108 on the stud by means of a nut 110 on a threaded extension of the stud 102. The axes of the pivots 72 coincide substantially with the longitudinal centerlines of the trailing arms 22.

Figure 2:
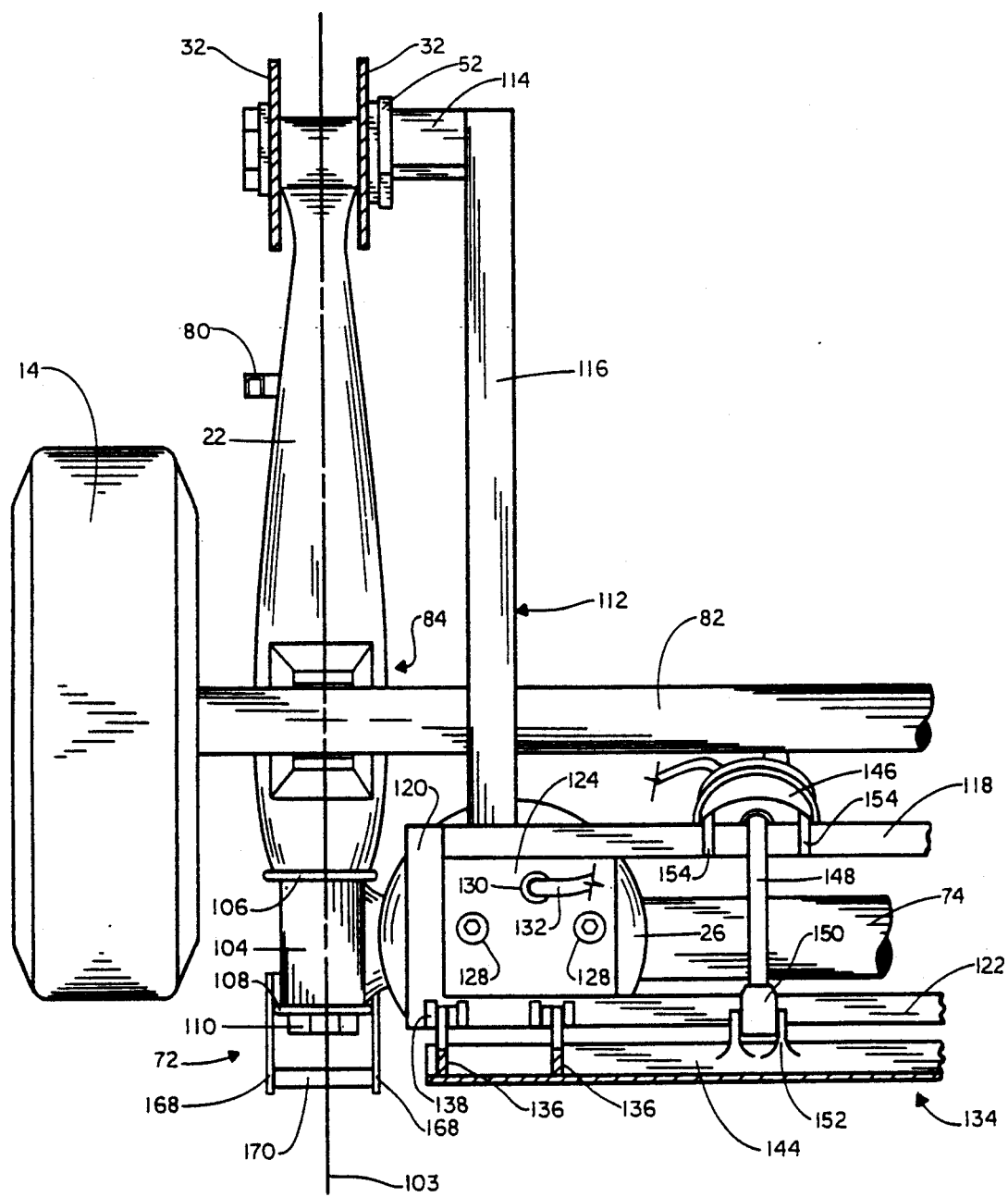
FIG. 2 is a plan view of a portion of the suspension taken along lines 2—2 of FIG. 1.

It can be seen that the upper end of each air spring 26 is secured to the carriage 30. The carriage 30 comprises an intermediate frame 112 which is pivotably connected to the frame bracket assembly 24, and which is free to pivot about the same axis of rotation as the trailing arms 22. It can be seen that the free end of the carriage is thus free to move between a first position adjacent the frame 12 and a second position adjacent a plane defined by the longitudinal axes 103 of the opposed pair of trailing arms 22. Of course, when the trailing arms 22 are in an extended position, such as when the wheels 14 are engaged with the ground 16, the second position is away from the frame 12. FIG. 2 illustrates only one side of a suspension system 10, so it should be understood that an identical frame bracket assembly with trailing arm and portion of an intermediate frame is disposed on an opposite side of the vehicle. The intermediate frame 112 comprises a pair of cantilevers 114, one each of the pair extending inwardly from its corresponding lever 52. An arm 116 extends rearwardly from the inner end of each cantilever 114. A front crosspiece 118 connects the distal ends of the pair of arms 116. The side members 120 extend further rearwardly from the front crosspiece 118, and are connected horizontally by a rear crosspiece 122. A mounting plate 124 secured to a lower portion of the intermediate frame 112 carries an upper support plate 126 for mounting an upper end of the air spring 26 by conventional bolts 128. An air supply port 130 is plumbed to deliver pressurized air to and exhaust the air from the air spring 26 by means of air supply line 132.

Figure 3:
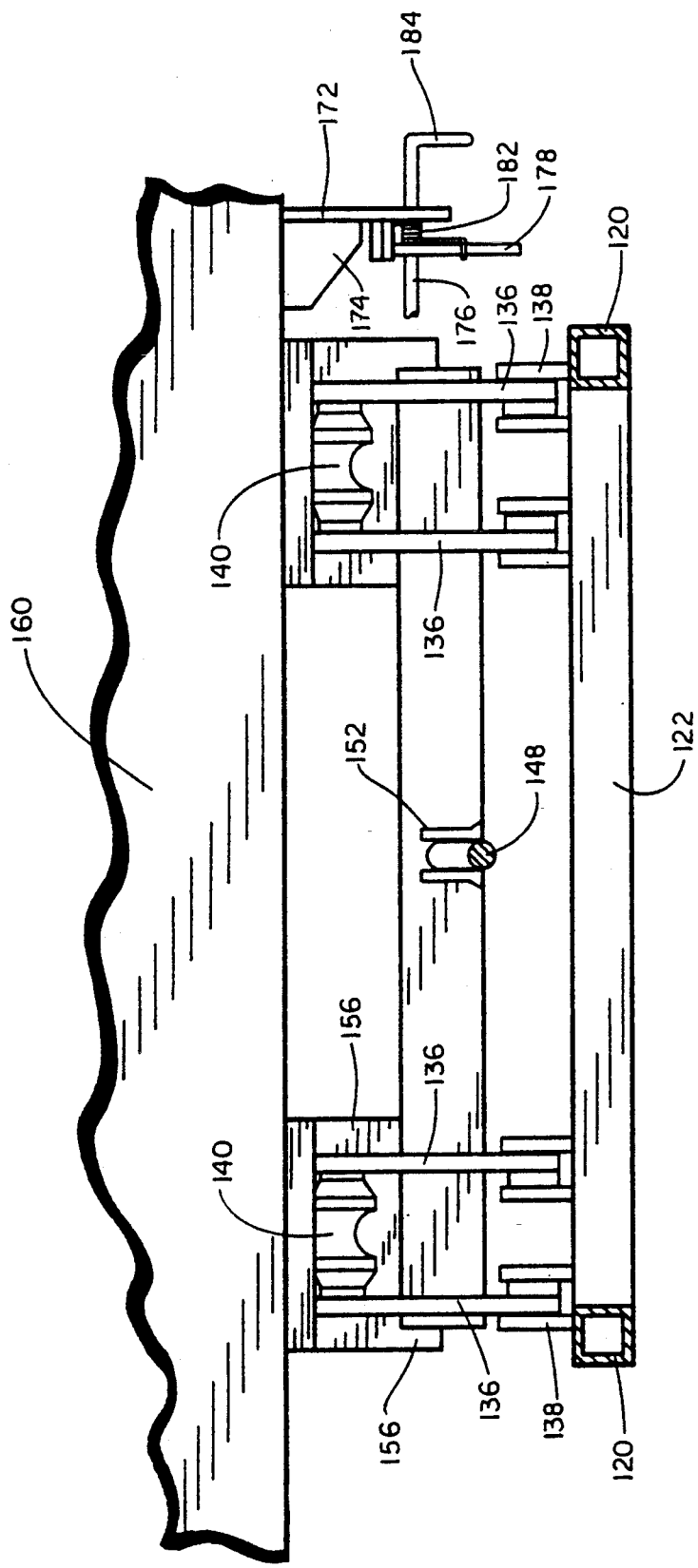
FIG. 3 is an fragmentary view, partly in section, taken along lines 3—3 of FIG. 2.

Referring now to FIGS. 1 through 3, a brace mechanism 134 is provided to brace the carriage 30 in a third position which is relative to the frame 12, thereby providing a fixed support for the upper end of the air springs 26. The brace mechanism 134 comprises a plurality of toggle links 136, each of which is pivotably connected at one end to a clevis 138 extending from an upper surface of the rear crosspiece 122. A bumper 140 is disposed between each pair of toggle links 136 at an upper end thereof. The bumper 140 may be rotatably mounted on a shaft 142 extending between each pair of toggle links 136. A cross brace 144 extends laterally across all of the toggle links 136 connecting them together at intermediate portions thereof. Thus, the toggle links 136 all rotate about the clevises 138 at the same time.

An actuator 146 is fixedly secured to the front crosspiece 118 of the intermediate frame 112 for moving the toggle links 136 toward and away from a braced position. The actuator 146 has a housing which defines a fluid chamber 147. A push-rod 148 extends from the chamber 147 and is actuated for movement in a generally longitudinal direction by the delivery of pressurized fluid such as air to the chamber 147. Any conventional operating mechanism for fluid actuators may be employed such as an elastomeric diaphragm or a piston. A return spring can be provided within the actuator to cause the push-rod 148 to retract when air is evacuated from the chamber 147. It will be understood that other types of actuators, such as electromechanical actuators, may also be employed. The distal end 150 of the push-rod 148 is pivotally connected to the cross member 144 at a clevis 152. The actuator 146 may be secured to the front crosspiece 118 by means of mounting brackets 154.

FIG. 1 illustrates the suspension system 10 in the locked position for highway use. It can be seen that the bumper 140 securely abuts a keeper 156 which is fixedly secured to the frame 12. The keeper 156 comprises an inverted J-shaped plate supported by a mounting plate 158 which is secured to the frame by means of a cross member 160 thereby forming a socket for receiving the bumper. In the normal highway mode, the bumper 140 is constrained against upward movement by the keeper 156. Pressurized air delivered to the actuator 146 maintains the push-rod 48 in an extended position which, in turn, rotates the toggle links 136 rearwardly to a bracing position, thereby forcing the bumper 140 into engagement with the keeper 156. The socket defined by the keeper constrains the bumper against forward and aft movement relative to the frame. The carriage 30 is thus fixed relative to the frame 12 in a third position so long as pressurized air is delivered to the actuator 146 and the air springs 26. The trailing arms 22 are still free to rotate relative to the frame 12 and the carriage 30. The air springs 26 disposed between the trailing arms 22 and the locking mechanism 30 provide a conventional cushion for movement of the trailing arms 22.

A lock mechanism 162, as shown in FIGS. 1-2 is provided for mechanically retaining the trailing arms 22 and the carriage 30 in the retracted position. The lock mechanism comprises a latch assembly 164 mounted to the frame 12 and a striker assembly 166 mounted to each trailing arm 22. The striker assembly 166 includes a pair of spaced plates 168 extending rearwardly from the trailing arm 22. A striker 170 is mounted to and between the plates.

A latch assembly 164 is located on each side of the vehicle for engagement with the striker 170 associated with each trailing arm 22, and includes a mounting plate 172 which depends from the frame 12 and is secured thereto by a gusset 174. A rod 176 extends between the mounting plates 172 and is rotatably mounted thereto. The rod 176 carries a latch plate 178 adjacent to each mounting plate 172. The latch plate 178 has a hook portion 180 which is adapted to catch the striker 170 when the suspension is retracted. Preferably, the latch plate 178 is biased by a spring 182 toward the catch position. A handle 184 connected to rod 176 permits manual rotation of the rod and the latch plate 178 for disengaging the hook portion 180 from the striker 170 when the suspension is to be moved away from the retracted position.

Figure 8:
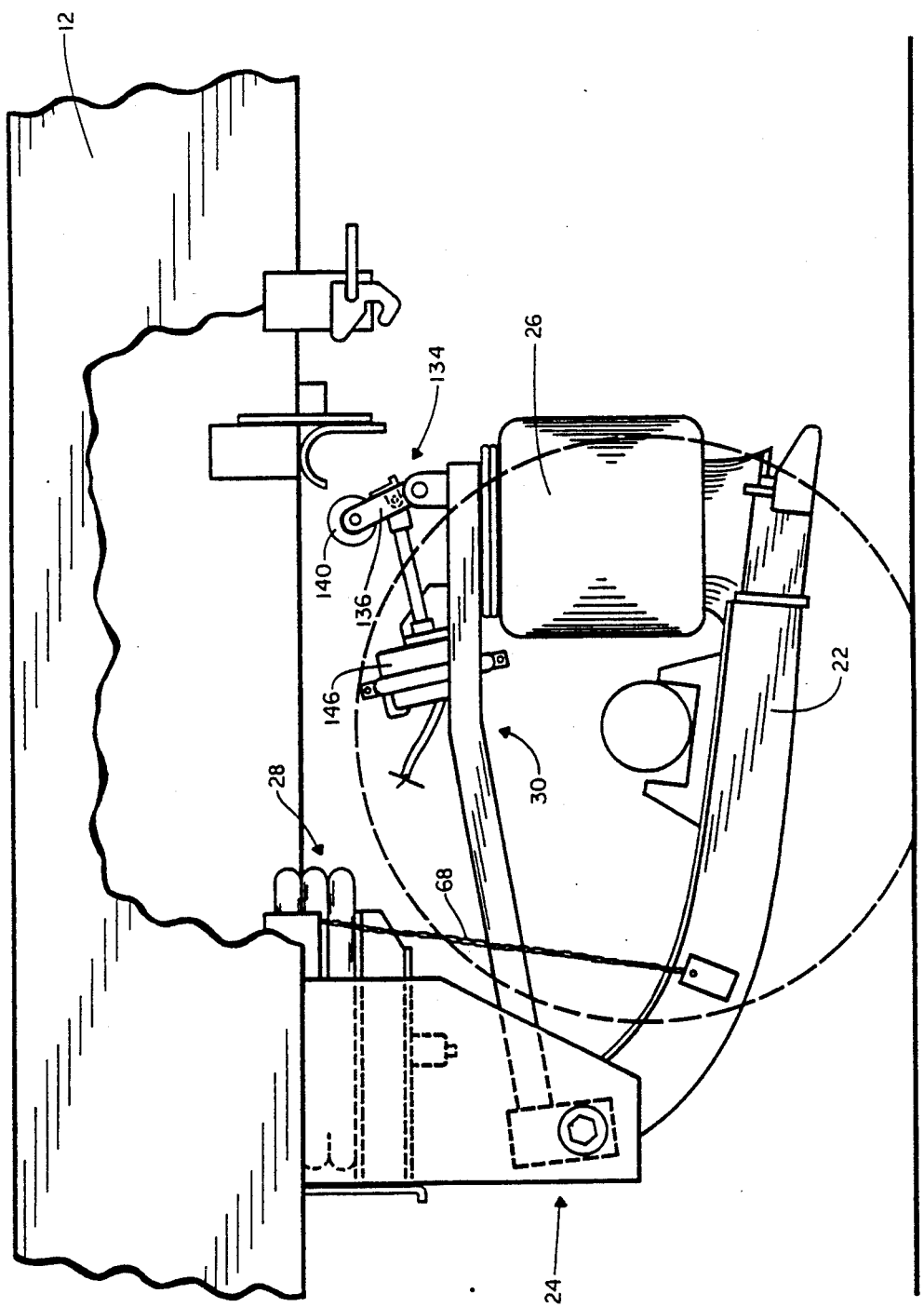
FIG. 8 is an elevational view of the suspension of FIG. 1 as the primary air springs are being deflated.

FIGS. 7 through 9 illustrate the operation of the invention during extension and retraction of the suspension. When it is necessary to lift the frame 12 relative to the ground surface 16 to permit the introduction of a rail bogie between the frame and the ground surface, for example, additional pressurized air is delivered to the air springs 26 causing them to inflate to a maximum limit. During this operation, increased pressure in the air springs 26 acts against the carriage 30, causing it to rise relative to the ground surface 16. Since the carriage 30 is braced against the frame 12 in the third position by the brace mechanism 134, the frame 12 also rises relative to the ground surface 16. When the air springs 26 reach their maximum limit of inflation, the maximum limit of upward travel of the frame 12 is attained relative to the ground surface 16. At this point, the rail bogie or other support means may be provided beneath the frame 12.

Retraction of the suspension system occurs by exhausting air from the air springs 26 and from the actuator 146, as illustrated in FIG. 8. With a rail bogie (not shown in FIG. 8) or other support secured between the frame 12 and the ground surface 16, air may be evacuated from the air springs 26 and the actuator 146. As air is evacuated from the air springs 26, the carriage 30 will drop relative to the frame 12 by the force of gravity toward the second position, thereby releasing the bumper 140 from the socket of the keeper 156. At about the same time, evacuation of air from the actuator 146 will permit a return spring therein to retract the push-rod 148, thus moving the bumper 140 away from contact with the keeper 156. This action defines a first stage of retraction wherein the carriage 30 is now free to pivot relative to the frame 12 and the trailing arms 22.

In a second stage, the suspension 10 may be retracted by actuating the lift mechanism 28. Air under pressure is delivered to the air spring 62 which causes the upper crosspiece 64 to elevate, pulling up the trailing arms 22 by means of the lift cables 80. The air springs 26 collapse, and the upward movement of the transverse beam 74 pushes against the intermediate frame 112, thus lifting the carriage 30 simultaneously with the trailing arms 22. As the trailing arms 22 approach the fully retracted position, the striker 170 on each trailing arm contacts the latch plate 178 on each latch assembly 164 and forces the latch plate to rotate away from the catch position against the spring bias. When the retracted position is attained, the hook portion 180 engages the striker 170 securely restraining the latter from downward movement. At the upper limit of travel illustrated in FIG. 9, the lift air spring 62 is fully inflated, the suspension air springs 26 are fully deflated, and the carriage 30 has been completely disengaged from the frame 12 and carried upwardly by the air springs 26 and the transverse beam 74 toward the first position wherein the trailing arms 22 are mechanically latched to the frame 12.

Reasonable variation and modifications are possible within the scope of the foregoing disclosure and drawings without departing from the spirit of the invention which is defined by the appended claims.

The embodiments of the invention in which an exclusive property or privilege is claimed are defined as follows:

1. In a suspension for a vehicle, said vehicle having a frame, and said suspension comprising a pair of control arms pivotally mounted to the frame for swinging movement relative thereto, said control arms carrying ground engaging wheels, spring means between the control arms and the frame for cushioning the swinging movement of the control arms relative to the frame, and lift means for moving the control arms and the wheels to a retracted position relative to the frame, the improvement comprising:

a carriage pivotally mounted to the frame for swinging movement of the free end thereof between a first position adjacent to the frame and a second position adjacent to a plane defined by the longitudinal axes of the control arms, said carriage supporting an upper portion of the spring means so that the spring means is disposed between the control arms and the carriage, whereby the wheels can be moved a greater degree toward the frame when the lift means moves the control arms and the wheels to the retracted position than by collapsing the spring means.

2. A suspension according to claim 1 wherein the carriage pivots about the same axis as the control arms.

3. A suspension according to claim 2 wherein a transverse beam is mounted between the control arms, and a lower portion of the spring means is supported by the beam.

4. A suspension according to claim 3 wherein the spring means comprises an air spring.

5. A suspension according to claim 1 further comprising bracing means for fixing the carriage in a third position relative to the frame when the wheels are in the ground engaging position, and for releasing the carriage for movement thereof between the first and second positions.

6. A suspension according to claim 5 wherein the carriage pivots about the same axis as the control arms.

7. A suspension according to claim 6 wherein a transverse beam is mounted between the control arms and a lower portion of the spring means is supported by the beam.

8. A suspension according to claim 7 wherein the bracing means is carried by the carriage.

9. A suspension according to claim 8 wherein the bracing means comprises a link pivotally connected at one end to the carriage; and an actuator connected to the link for moving the link toward and away from a bracing position.

10. A suspension according to claim 9 wherein the other end of the link carries a bumper which contacts the frame when the link is in the bracing position.

11. A suspension according to claim 9 wherein the actuator comprises a housing defining a fluid chamber, and a rod extending from the chamber, said rod having an outer end pivotally connected to the link, and said rod further being movable in a generally longitudinal direction in response to the delivery and exhaustion of pressurized air to the chamber.

12. A suspension according to claim 5 wherein a transverse beam is mounted between the control arms and a lower portion of the spring means is supported by the beam.

13. A suspension according to claim 5 wherein the bracing means is carried by the carriage.

14. A suspension according to claim 5 wherein the bracing means comprises a link pivotally connected at one end to the carriage; and an actuator connected to the link for moving the link toward and away from a bracing position.

15. A suspension according to claim 14 wherein the other end of the link carries a bumper which contacts the frame when the link is in the bracing position.

16. A suspension according to claim 14 wherein the actuator comprises a housing defining a fluid chamber, and a rod extending from the chamber, said rod having an outer end pivotally connected to the link, and said rod further being movable in a generally longitudinal direction in response to the delivery and exhaustion of pressurized air to the chamber.

17. In a suspension for a vehicle, said vehicle having a frame, and said suspension comprising a pair of control arms pivotally mounted to the frame for swinging movement relative thereto, said control arms carrying wheels in a ground engaging position, spring means between the control arms and the frame for cushioning the swinging movement of the control arms relative to the frame, and lift means for moving the control arms and the wheels to a retracted position relative to the frame, the improvement comprising:

a carriage pivotally mounted to the frame for swinging movement among a first position adjacent to the frame, a second position adjacent to the control arms, and a third position intermediate the first and second positions when the wheels engage the ground, said carriage supporting an upper portion of the spring means; and a brace pivotally mounted to the carriage and adapted to engage the frame when the carriage is in the third position, and be disengaged from the frame when the carriage is in the first and second positions;

whereby the wheels can be moved a greater degree toward the frame when the lift means moves the control arms and the wheels to the retracted position than by collapsing the spring means.

18. A suspension according to claim 17 wherein the bracing means comprises a link pivotally connected at one end to the carriage; and an actuator connected to the link for moving the link toward and away from a bracing position.

19. A suspension according to claim 18 wherein the other end of the link carries a bumper which contacts the frame when the link is in the bracing position.

20. A suspension according to claim 17 wherein a transverse beam is mounted between the control arms, and a lower portion of the spring means is supported by the beam.

* * * * *